United States Patent [19]
Govoni et al.

[11] Patent Number: 5,291,779
[45] Date of Patent: Mar. 8, 1994

[54] HIGH-WIND SNOW COLLECTOR

[75] Inventors: John W. Govoni, Plymouth, N.H.; Debra A. Meese, Norwich, Vt.

[73] Assignee: The United States of America as represented by the Secretary of the Army, Washington, D.C.

[21] Appl. No.: 908,210

[22] Filed: Jul. 2, 1992

[51] Int. Cl.[5] ............................................. G01W 1/00
[52] U.S. Cl. ................................. 73/170.17; 73/863.52
[58] Field of Search ............. 73/432.4, 170.17, 170.16, 73/863.52, 864.51; 383/33; 220/404

[56] References Cited
U.S. PATENT DOCUMENTS
3,815,778  6/1974  Martin ................................. 220/404

Primary Examiner—Richard E. Chilcot, Jr.
Assistant Examiner—Joseph L. Felber
Attorney, Agent, or Firm—Luther A. Marsh

[57] ABSTRACT

The present invention is an apparatus for collecting snow in a high wind environment. An apertured vessel has upstanding side walls, a closed bottom and an open top for receiving a flexible liner therein. The walls of the vessel have apertures therein for allowing the liner to be drawn against the interior walls of the vessel by wind induction. A baffle is secured to the vessel for covering a portion of the open top to thereby promote entrapment of precipitation within the vessel. An adjustable supporting bracket is secured to the vessel for selectively positioning the open top of the vessel with respect to the wind to maximize collection of now. Other forms of precipitation may be collected in the apparatus as desired.

7 Claims, 1 Drawing Sheet

U.S. Patent      Mar. 8, 1994      5,291,779
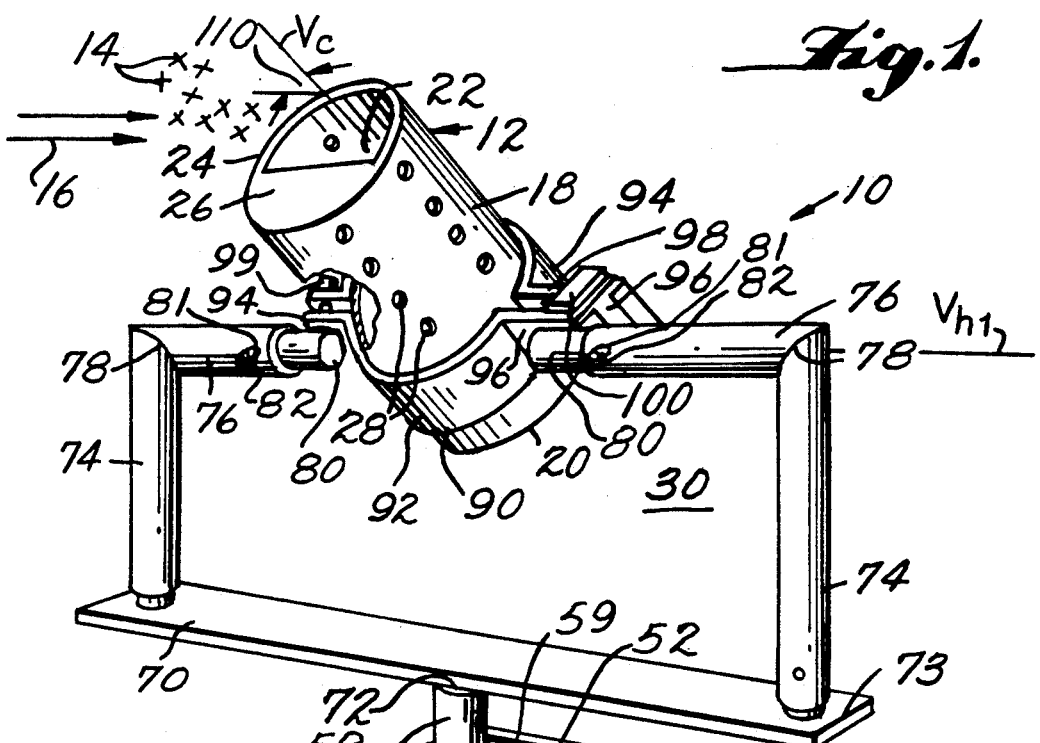
*Fig. 1.*
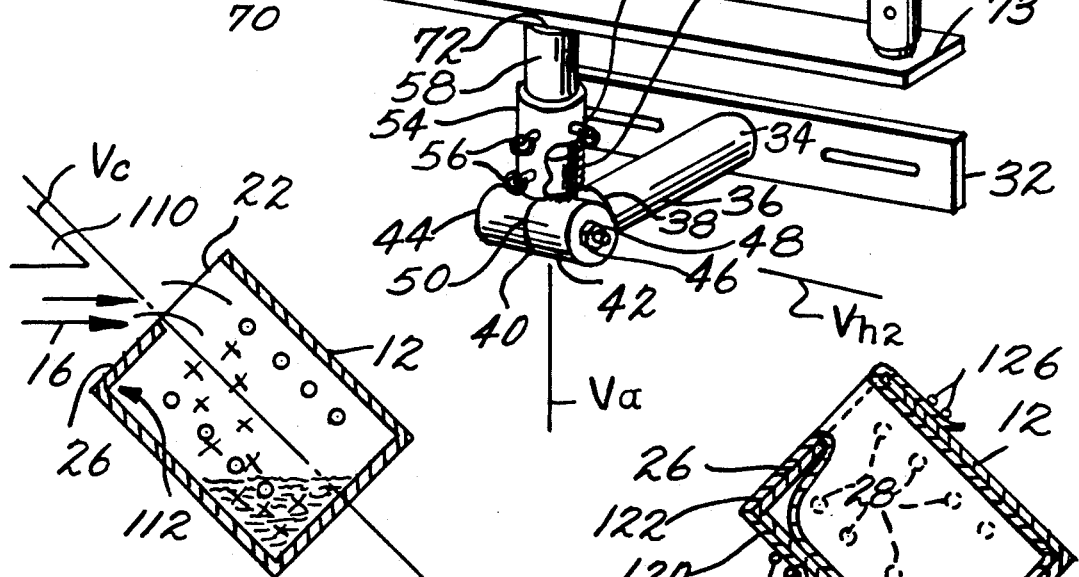
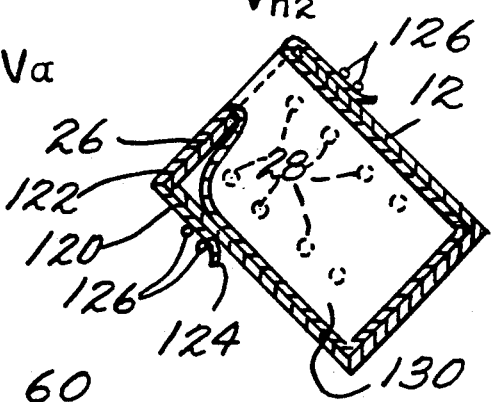
*Fig. 3.*
*Fig. 2.*
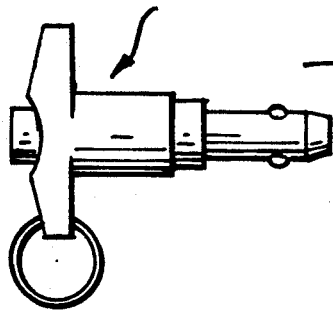
*Fig. 4.*

HIGH-WIND SNOW COLLECTOR

FIELD OF THE INVENTION

The invention described and claimed herein may be manufactured and used by or for the Government of the Uunited States of America for governmental purposes without the payment of royalties thereon or therefor.

The invention relates to a collector for precipitation. More specifically, the invention relates to an apparatus particularly adapted for collecting snow in a high wind environment employing a vessel which may be oriented with respect to wind direction for optimizing the rate of snow collection.

BACKGROUND OF THE INVENTION

Snow is collected at various fixed locations for a variety of reasons including to perform chemical analysis, to determine collection efficiency and for other reasons. The location is selected often times based upon its relative isolation from sources of local pollution. A mountain top is an ideal collection point. Snow collected at such a location can provide an indication of pollution sources located far from the collection point. Thus, depending upon the wind direction, a correlation between remote sources of pollutants and the storm track can be made.

A problem with mountainous regions is that the prevailing winds, especially in the winter time, may be gusting greater than 80 mph. It is therefore, difficult to collect precipitation of any kind, but it is especially difficult to collect snow in sufficient quantities to be practical. Known apparatus for collecting liquid precipitation typically includes a bucket lined with a removable cup or other rigid liner. The apparatus is typically located near the ground and is mounted vertically for catching the precipitation. In high winds, the precipitation is blown over the top of the device. While the bucket may be oriented facing the wind direction, this often results in the precipitation being blown out of the vessel as quickly as it is deposited.

For snow collection, it is desirable to place within the collection vessel a flexible liner for each sample. However, it has been found that it is difficult to maintain such liners in place because the prevailing winds drag the liner out of the vessel.

SUMMARY OF THE INVENTION

The present invention has been designed to obviate the limitations and shortcomings of the described prior arrangements. In particular, the invention is directed to an apparatus for collecting snow in a high wind environment. While the apparatus is particularly adapted to efficiently collect snow, it is also capable of collecting other forms of solid and liquid precipitation. The apparatus includes an apertured vessel having upstanding side walls, a closed bottom and an open top for receiving a flexible liner therein. The walls of the vessel have apertures therein whereby the liner is drawn against the interior walls of the vessel by wind induction. A baffle is secured to the vessel for covering a portion of the open top to thereby promote entrapment of snow within the vessel. An adjustable supporting bracket having at least three degrees of freedom is secured to the vessel for selectively positioning the open top of the vessel with respect to the wind for maximizing collection efficiency.

DESCRIPTION OF THE DRAWINGS

FIG. 1 is a prospective view of the snow collector in accordance with the present invention;

FIG. 2 is a fragmentary side sectional elevation of the vessel or receptacle portion of the collector of the present invention with a flexible plastic liner secured therein;

FIG. 3 is a schematic illustration of the process by which a low density form of precipitation such as snow is collected in a high wind environment;

FIG. 4 is a detail of a quick release connector advantageously utilized in implementing the present invention.

DESCRIPTION OF THE INVENTION

FIG. 1 illustrates in a perspective view, a snow collector 10 in accordance with the present invention. Although the invention is particularly well adapted for collecting low density forms of precipitation such as snow in high wind environments, other forms of precipitation may be collected with the invention. Accordingly, the invention will be described in terms of snow collection, but without limiting the invention to snow collection only.

The collector 10 includes a vessel portion 12 for collecting snow flakes 14 carried by a wind stream 16. The snow 14 is represented by crosses and the wind stream is represented by the Arrows 16.

The vessel 12 may take a variety of forms but in a particular embodiment is in the form of a right circular cylinder having a cylindrical side wall 18, a closed bottom wall 20 and an open top 22 defined by an upper marginal end 24 of the side wall 18. A baffle 26 is attached to the vessel 12 at the upper marginal edge 24, as illustrated. The baffle 26 occupies between about one quarter and one third of the area represented by the circular marginal edge 24. A plurality of apertures circular holes 28 are formed in the side wall 18. In a particular embodiment four (4) rows of six (6) holes 28 are formed in the side wall 18 as illustrated. The vessel may be formed of a polycarbonate such as a product known as Lexan sold by G.E.

Adjustable support or frame work 30 supports the vessel 12 in space. The frame work 30 includes mounting bracket 32 which may be attached to a fence wall, or other fixed object. The mounting bracket 32 includes a horizontal arm 36 secured to the bracket 32 at its proximal end 34. A distal end 38 of the horizontal arm 36 carries an adjustable elbow 40 which includes a pair of opposing frictionally engaging members 42 and 44 having a through aperture 46 and a fastener 48 for securing the members 42 and 44 at opposing surfaces 50. One of the members 44 is attached to the horizontal member 34 and the other member 42 is free to rotate about a horizontal axis defined by the aperture 46. The member 44 carries an upstanding boss 52 which is affixed thereto as illustrated. A sleeve portion 54 is secured to the upstanding boss 52 by a removable pin 56. A cylindrical standard 58 is likewise secured in the sleeve 54 in abutment with the boss 52. Removable pin 56 likewise secures the standard 58 and the sleeve 52. The boss 52 And the standard 58 may have a plurality of diametric holes 59 formed therein which will allow the rotation of the standard 58 With respect to the boss 52.

An elongated support member 70 is attached to a distal or free end 72 of the standard 58. The elongated support member 70 carries upstanding parallel frame members 74. A pair of opposed shaft supports 76 are attached to free or distal ends 73 of the supports 74. In an exemplary embodiment, the shaft supports 76 and the vertical support 74 are cylindrical members which are joined by a bevel or mitered weld at the free end 78 as illustrated. Shaft members 80 are sleeved within the shaft supports 76. The shaft supports 76 and the shafts 80 each have one or more diametric holes 81 which may be aligned. Removable pins 82 are located in the holes 81 for positioning the shafts 80 with respect to the shaft support 76.

The shafts 80 are interconnected by a vessel support 90 comprising a pair of confronting split rings 92 and 94 which capture the vessel 12 therebetween. The split ring 92 has radial I ears 96 which are welded or secured to the shafts 80 as illustrated. The split ring 94 likewise has a pair of opposed ears 98 which are secured in confronting relationship with the ears 96. In the arrangement illustrated, a hinge 100 interconnects one pair of the confronting ears 96 and 98, and a bolt, pin or other fastener 99 secures the opposing pair of ears 96 and 98 as illustrated to thereby secure the vessel 12 between the split rings 92 and 94.

In the arrangement illustrated, the support 30 allows the vessel 12 many degrees of freedom. For example, the vessel 12 is rotatable about a vertical axis $V_a$. The vessel 12 is also rotatable about a first horizontal axis $V_{h1}$ aligned with the shafts 80. In the arrangement illustrated, the vessel may rotate 360° about the axis $V_{h1}$ and 360°0 about the axis $V_a$. In order to add further versatility to the arrangement, the vessel 12 may be oriented about a second horizontal axis $V_{h2}$ aligned with aperture 46 in elbow 40.

The apparatus may be easily adjusted by simply removing any one or more of the removable pins 54, 60 or 80 or by loosening the fastener 48 to effect adjustment of the apparatus. In the particular embodiment, the vessel 12 has a central axis $V_c$. Depending upon the wind direction and speed, the central axis $V_c$ of the vessel 12 is located at an angle 110 with respect to the wind 16. Under high wind conditions, for example, the axis $V_c$ of the vessel 12 is oriented with the open end 22 in the direction facing the wind. The angle 110 between the wind 16 and the central axis $V_c$ is preferably at about 60° or 45°. At this angle, a relatively low pressure area 112 is formed behind the baffle 26 whereby the precipitation 14 falls into the vessel and is not blown out by the high wind. Under lower wind conditions, perhaps 40 mph or less, the angle 110 with respect to the wind 16 may be 0°. In this case, the precipitation 14 is driven into the vessel 12 and captured behind the baffle 26. See for example, FIG. 3 which illustrates capture of the precipitation 14 within the vessel 12.

In a preferred embodiment, when multiple samples are to be taken, a plastic or polyethylene bag or liner 120 may be secured within the vessel 12. Excess material 122 at the open end 124 of the bag may be folded over the exterior of the vessel 12 as illustrated in FIG. 2. Fasteners such as rubber bands 126 may be provided to secure the bag 120 to the vessel 12. In the embodiment illustrated, the apertures or holes 28 allow the bag 120 to be drawn up against the interior surfaces 130 of the vessel 12 by a wind induction effect. In other words, the wind 16 causes a reduced pressure to be formed in the apertures 28 which draws the hag 120 against the inside wall 130 of the vessel 12 to thereby maintain the bag 120 in place. This is important because otherwise the low pressure within the bag 120 would cause it to be drawn out of the vessel 12 through the open top 22.

The removable pins 56 and 60 may be known as quick release pins such as single acting positive locking pins (FIG. 4). These pins may be inserted or removed from the various apertures with one gloved hand. With high wind conditions anticipated, the arrangement simplifies adjustment of the orientation of the vessel 12 with respect to the prevailing winds 16. Exemplary pins are manufactured by Lockwell and are shown in a published product bulletin. Any one of the devices illustrated in the bulletin may be employed.

While there has been described what at present is considered to be the preferred embodiment of the invention, it will be apparent to those skilled in the art that various changes and modifications may be made therein without departing from the invention and is intended in the appended claims to cover such changes and modifications as fall within the invention.

What is claimed is:

1. Apparatus for collecting snow in a high wide environment comprising an apertured vessel having an upstanding side wall, a closed bottom and an open top and apertures formed in the side walls;
    baffle means secured to the vessel at the open top for covering a portion of the opening in the vessel;
    adjustable support means for selectively positioning the open top of the vessel with respect to prevailing winds; and
    wherein a flexible sample bag is located in the vessel and the apertures provide a region of low pressure between an inside wall of the vessel and the exterior of the vessel whereby the sample bag is drawn against the inside wall of the vessel in response to prevailing winds.

2. The apparatus of claim 1, wherein the baffle covers between about one quarter and one third of the area of the open top.

3. The apparatus according to claim 1, wherein the vessel is a polycarbonate cylinder and the apertures are radial holes formed therein.

4. The apparatus according to claim 1, wherein the support means comprises a fixed support portion; an elbow portion connected thereto and an upstanding portion extending from the elbow and being rotatable about a first axis.

5. The apparatus according to claim 4, further comprising a frame member attached to the upstanding member, same frame member having opposed brackets for supporting the vessel therebetween, the brackets including opposed shaft portions rotatable in the brackets and a collar attached to the shafts for securing the vessel in, said elbow, upstanding member and rotatable shafts, providing at least three degrees of freedom for orienting the with respect to the wind.

6. Apparatus according to claim 5, wherein the upstanding member and the shafts have apertures formed therein and manually releasable pin means located in the apertures for selectively securing the upstanding member with respect to the elbow and the shafts with respect to the bracket when inserted therein.

7. Apparatus for collecting precipitation in a flexible bag in a high wind environment comprising:
    an apertured vessel having an upstanding side wall, a closed bottom and an open top and apertures formed in the side walls;
    baffle means secured to the vessel at the open top for covering a portion of the opening in the vessel; and adjustable support means for selectively positioning the open top of the vessel with respect to prevailing winds, said flexible bag being located in the vessel and the apertures providing a region of low pressure between an inside wall of the vessel and the exterior of the vessel whereby the flexible bag is drawn against the inside wall of the vessel in response to prevailing winds.

* * * * *